June 30, 1970    R. F. BASSETT    3,517,962
KNOCK-DOWN MOBILE HOME ASSEMBLY
Filed March 1, 1968    6 Sheets-Sheet 1
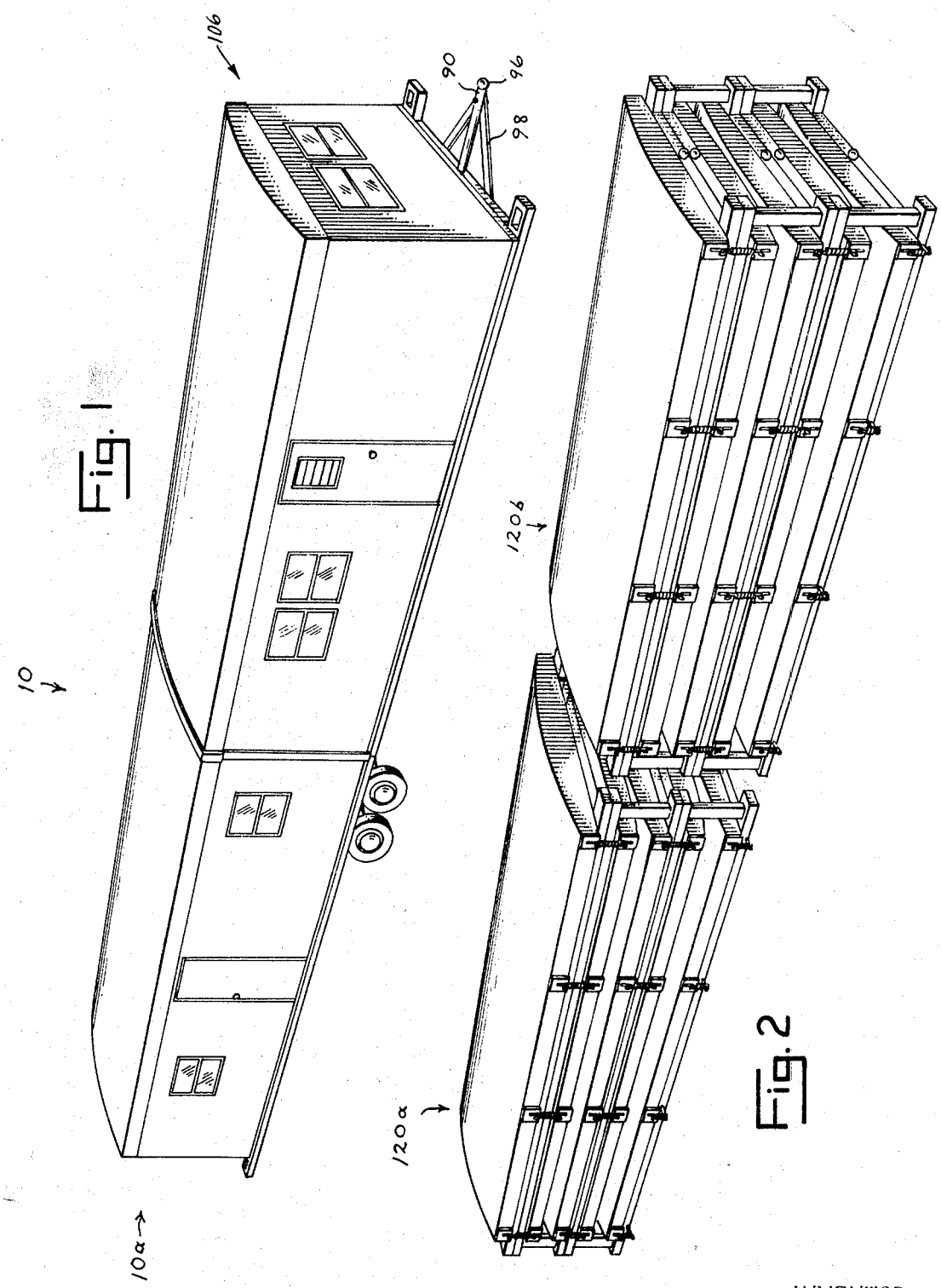
INVENTOR.
RAYMOND F. BASSETT
BY
ATTORNEY

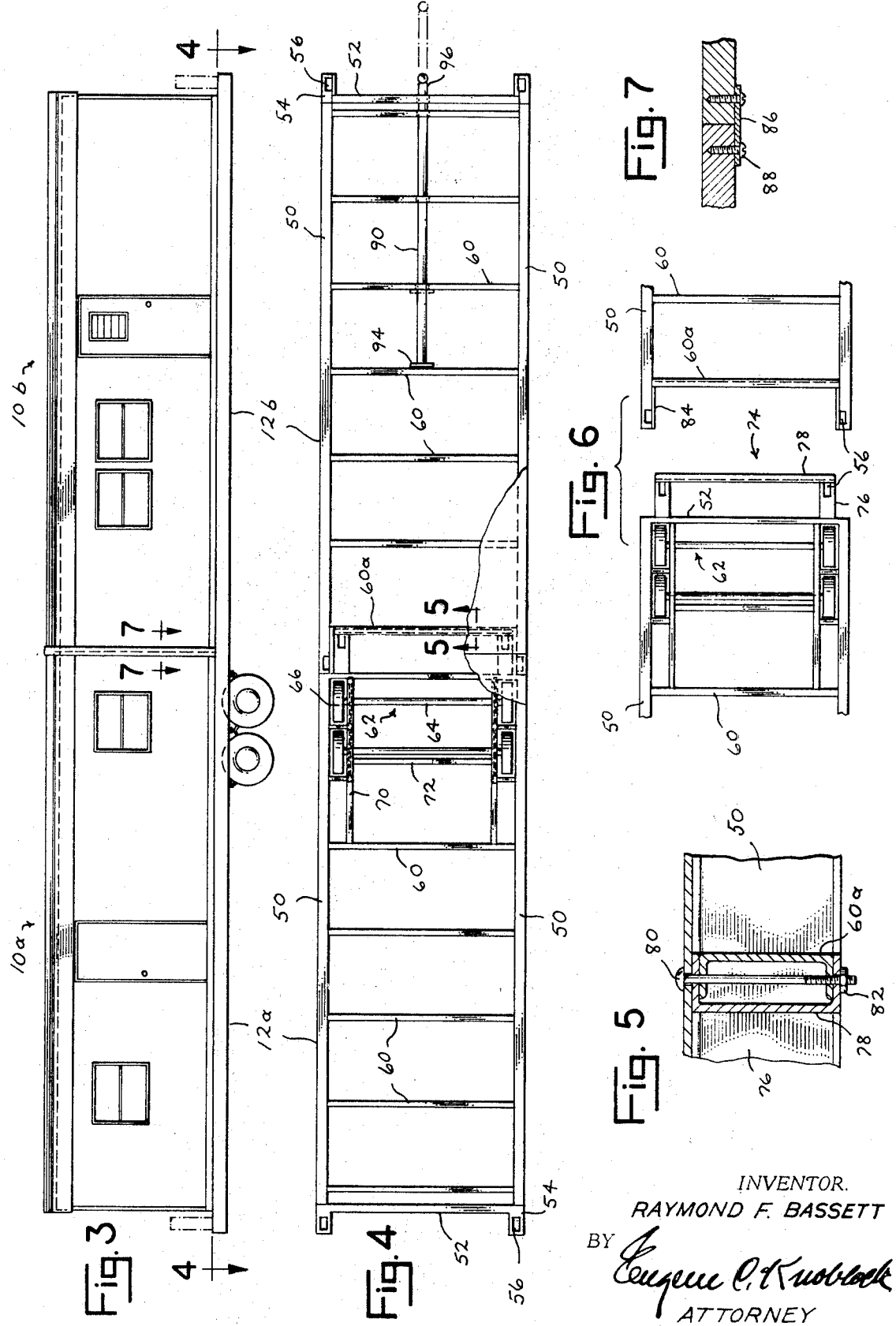

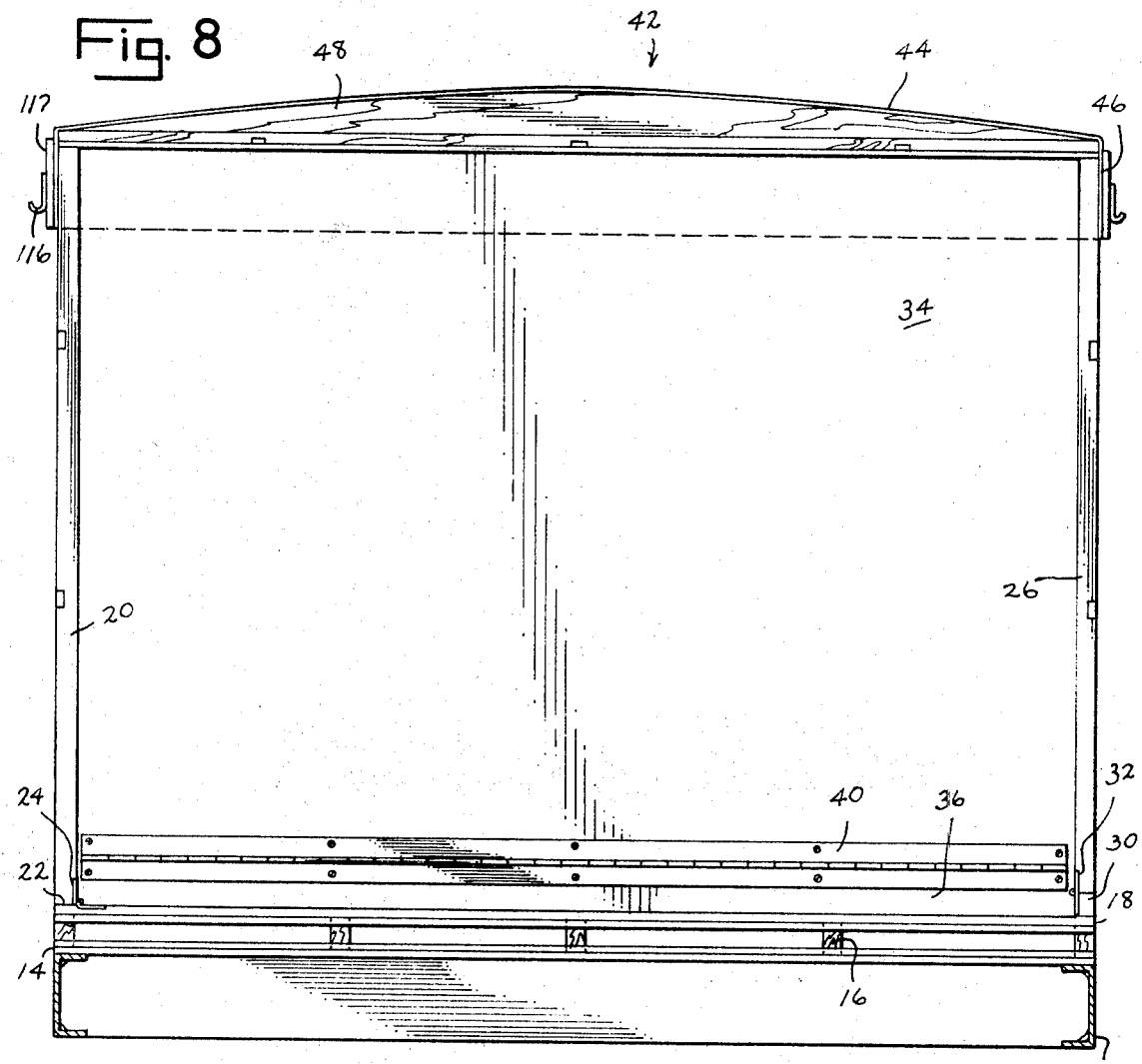
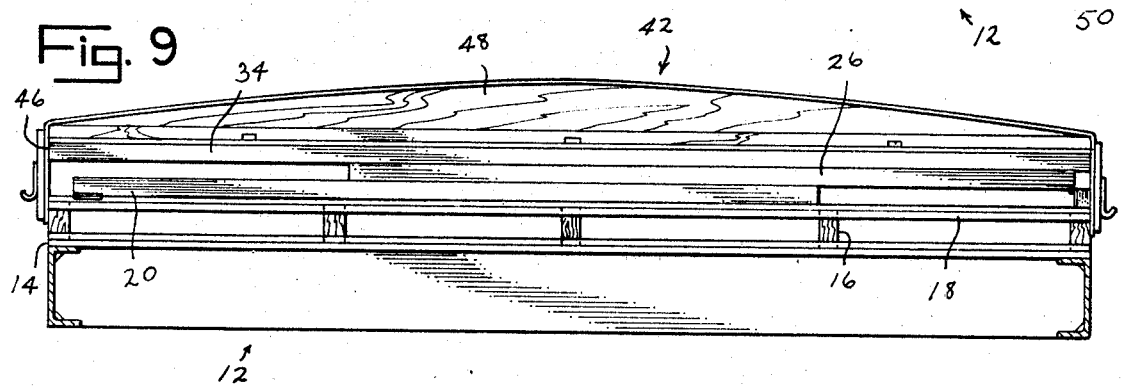

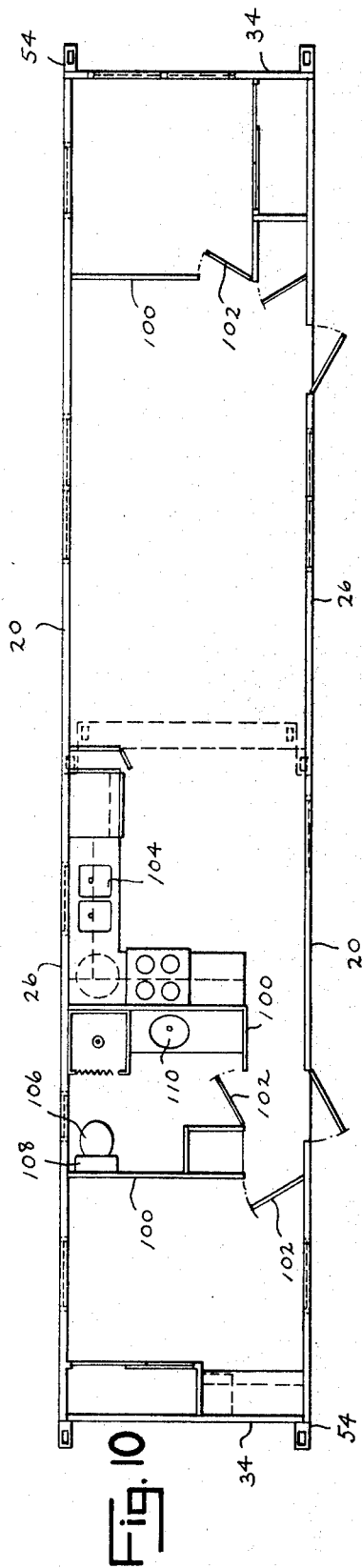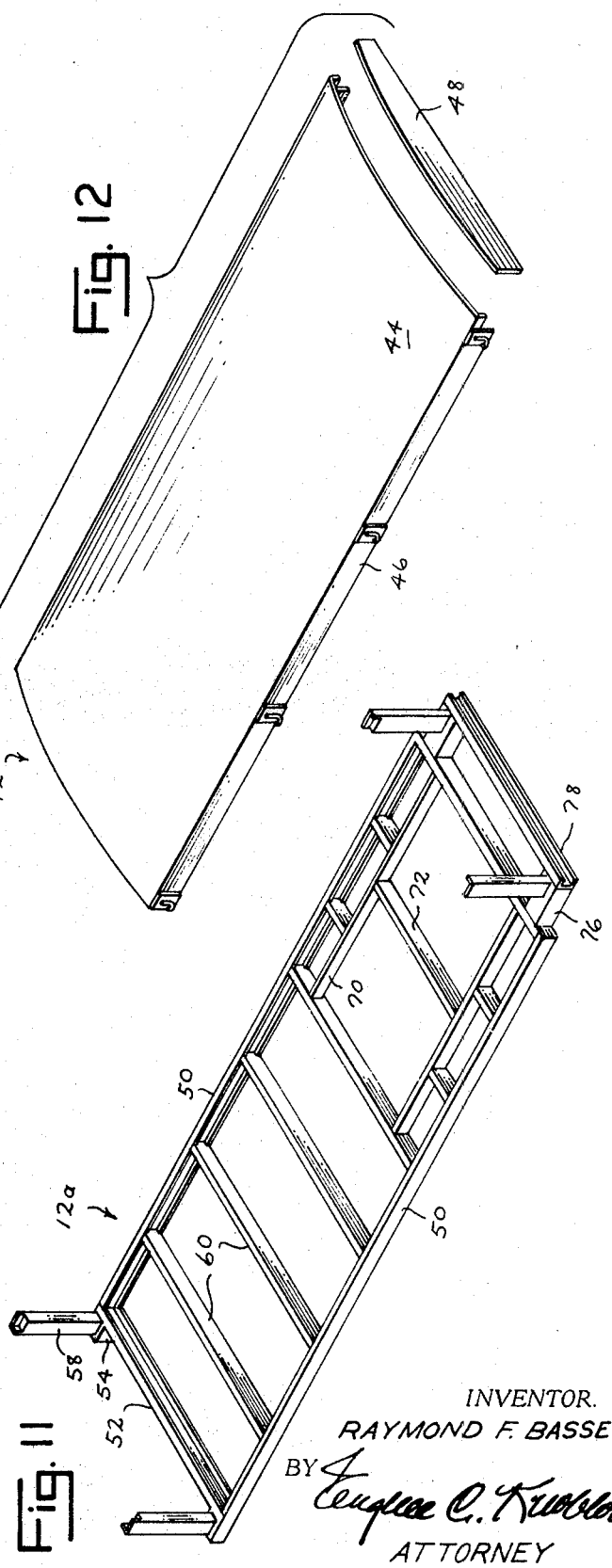

June 30, 1970 R. F. BASSETT 3,517,962
KNOCK-DOWN MOBILE HOME ASSEMBLY
Filed March 1, 1968 6 Sheets-Sheet 5
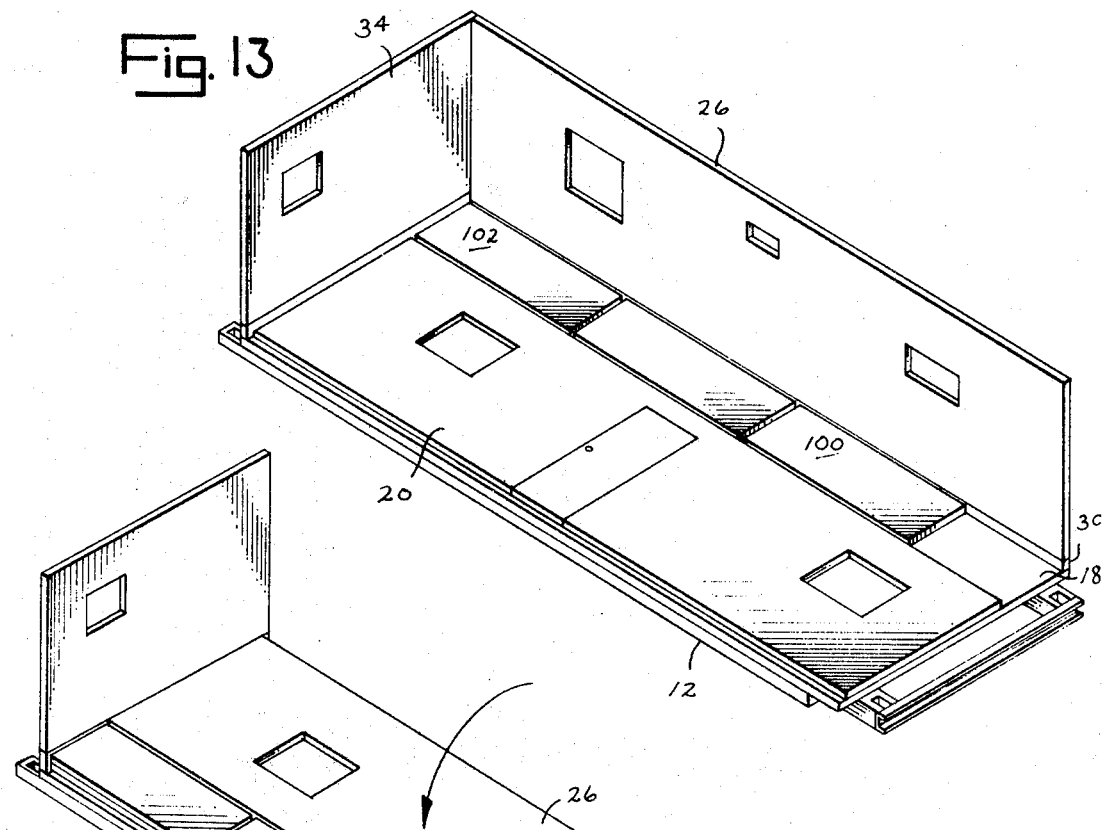
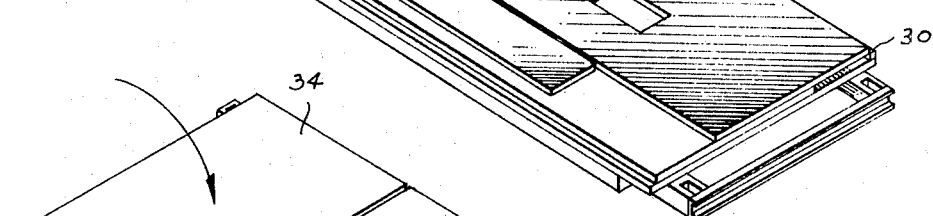
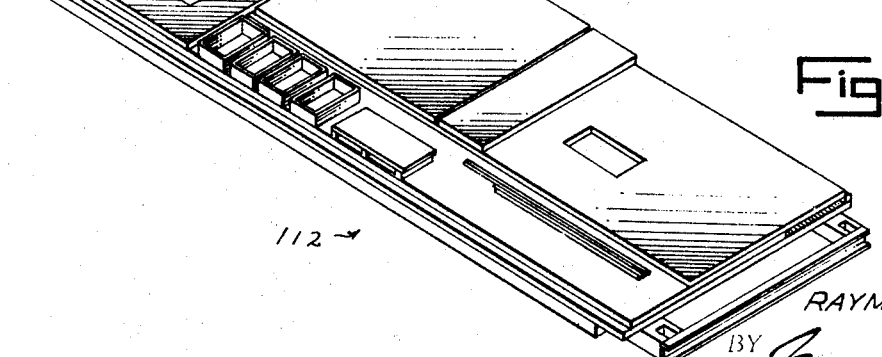
INVENTOR.
RAYMOND F. BASSETT
BY
Eugene C. Knoblock
ATTORNEY

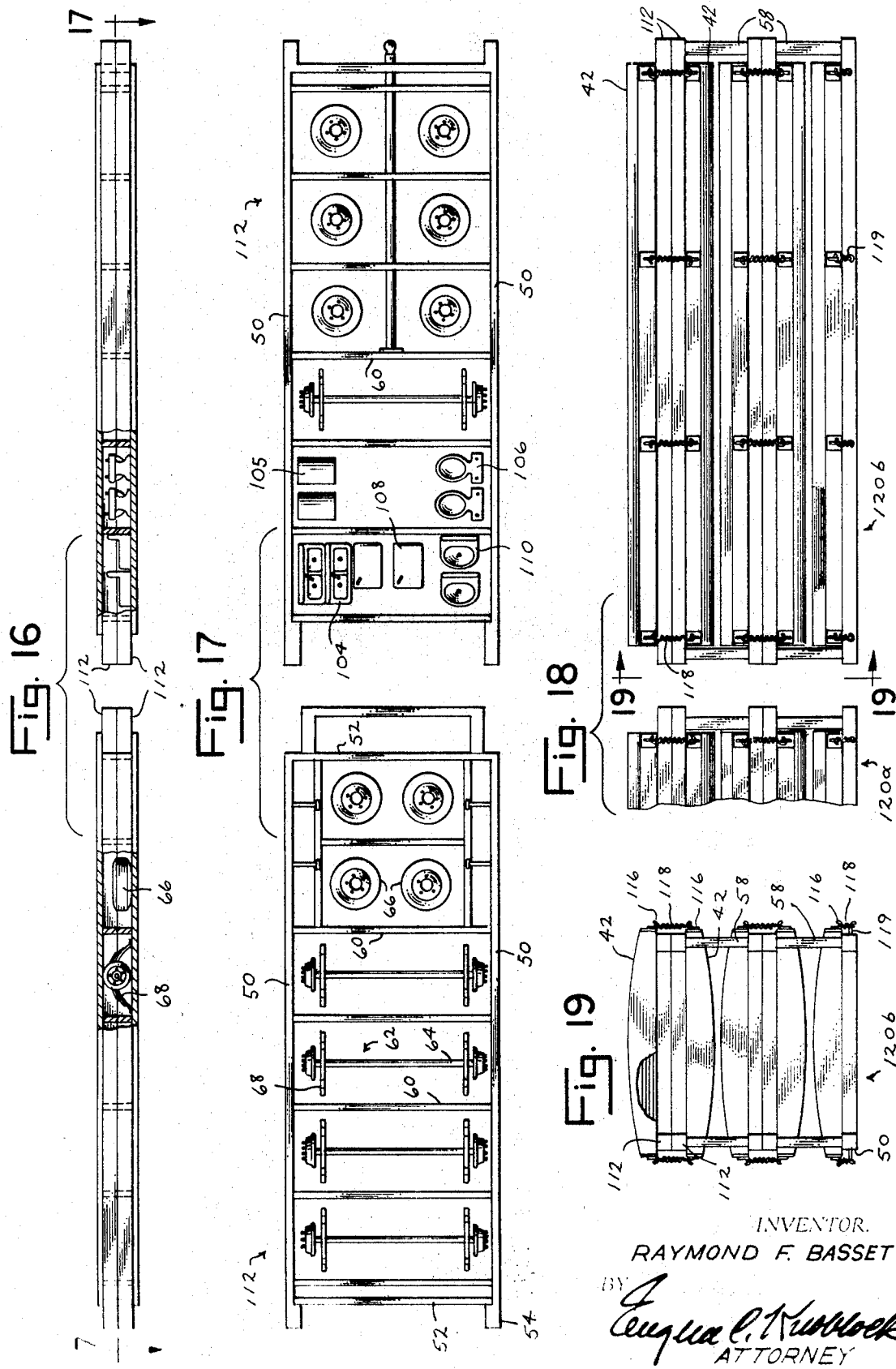

United States Patent Office 3,517,962
Patented June 30, 1970

3,517,962
KNOCK-DOWN MOBILE HOME ASSEMBLY
Raymond F. Bassett, Elkhart, Ind., assignor to Parkwood Homes, Inc., Elkhart, Ind.
Filed Mar. 1, 1968, Ser. No. 709,564
Int. Cl. B60p 3/34
U.S. Cl. 296—23
5 Claims

ABSTRACT OF THE DISCLOSURE

A knock-down mobile home assembly in which the mobile home has collapsible walls which fold over onto its floor structure. A roof mountable upon the walls in their erected position overlies the walls when collapsed to a folded and overlapped position. The collapsed unit with floor structure, folded and overlapped walls, and overlying roof may be assembled upon a similar collapsed unit in inverted relation to enclose components of both units. The pair of collapsed units so assembled may then be stacked with a single collapsed unit or with similar pairs of assembled collapsed units for shipment.

SUMMARY OF THE INVENTION

This invention pertains to a collapsible mobile home assembly comprising a floor structure, side and end walls mounted upon said floor structure, means permitting folding and overlapping of said walls upon said floor structure and a roof, the walls swinging between erected and overlapped positions, and the roof being mountable on the walls when erected or overlying the walls when collapsed. The collapsed mobile home unit may be removably mounted upon a similar collapsed unit with the bottom surfaces of the floor structures of each in engagement, and such collapsed units stacked with other collapsed units.

In transporting mobile homes for long distance shipments, such as overseas shipments, it has been customary to disassemble the homes prior to shipment, separately crating sub-assemblies or components, and reassembling the home once it reaches its destination. Alternatively, the component parts may be shipped for first assembly at the destination, in which case manufacturer's inspection of the assembled product is not possible. In both situations, the home must be assembled at destination under close supervision and by skilled labor in order to produce a finished product of good quality. The shipping of a plurality of mobile homes overseas in an assembled state is generally precluded because of the large amount of space required for storage in transit and the resultant high cost.

This invention pertains to a knock-down mobile home which may be collapsed and stacked with similar collapsed units to occupy only about ⅕ the volume of space required for shipping one completely assembled mobile home. The mobile home is so constructed that it can be erected and assembled at its destination easily and quickly by persons of average or ordinary mechnical skill using general purpose tools.

Accordingly, it is an object of this invention to provide a mobile home constructed to collapse to occupy a space constituting only a small fraction of the space required for a single erected mobile home.

Another object of this invention is to provide a knock-down mobile home which can be quickly and readily erected and assembled from collapsed condition by the use of ordinary tools by persons of average mechanical skill.

Other objects of this invention will become apparent upon a reading of the invention's description.

BRIEF DESCRIPTION OF THE DRAWINGS

A preferred embodiment of this invention has been chosen for the purposes of illustration and description wherein:

FIG. 1 is a perspective view of a mobile home in operative condition, constructed and assembled in accordance with the teachings of this invention.

FIG. 2 is a perspective view of a group of five mobile homes of the type shown in FIG. 1 which have been collapsed and stacked for shipment.

FIG. 3 is a side elevational view of the mobile home of FIG. 1.

FIG. 4 is a horizontal sectional view taken along line 4—4 of FIG. 3.

FIG. 5 is an enlarged fragmentary detail sectional view taken along line 5—5 of FIG. 4.

FIG. 6 is a fragmentary view taken on line 4—4 of FIG. 3 showing component support frames of floor structures in paired arrangement preparatory to inter-connection thereof.

FIG. 7 is a fragmentary sectional detail view taken along line 7—7 of FIG. 3.

FIG. 8 is an end view of an erected mobile home with parts shown in section.

FIG. 9 is an end view of the mobile home in collapsed form.

FIG. 10 is a typical floor plan of the mobile home of FIG. 1.

FIG. 11 is a perspective view of one section of a support frame shown in FIG. 4 with stacking posts mounted thereon.

FIG. 12 is a perspective view of one section of a roof assembly of the mobile home of FIG. 1 showing a detached end plate.

FIG. 13 is a perspective view of one section of the mobile home of FIG. 1 with one side wall collapsed and separate overlying mobile home components resting upon the floor.

FIG. 14 is a perspective view of a mobile home section with both side walls collapsed.

FIG. 15 is a perspective view of a mobile home section with all walls collapsed.

FIG. 16 is a view in side elevation with parts shown in section to illustrate arrangement of a pair of floor structures mounted in a back-to-back relationship for shipment and enclosing individual mobile home components.

FIG. 17 is a longitudinal horizontal view taken along line 16—16 of FIG. 16 and showing the placement of component mobile home parts within floor structures paired for shipment.

FIG. 18 is a fragmentary view in side elevation of the stacked collapsed units of FIG. 2.

FIG. 19 is a view in end elevation of the stacked collapsed units of FIG. 2.

DESCRIPTION OF THE PREFERRED EMBODIMENTS

The preferred embodiment of the invention here illustrated is not intended to be exhaustive or to limit the invention to the precise form disclosed. It is chosen and described in order to best explain the principles of the invention and its application and practical use to thereby enable others skilled in the art to best utilize the invention.

As best shown in FIGS. 1, 3 and 4, each mobile home 10 preferably consists of two sections, 10a and 10b, which are individually constructed and joined end to end. Each of the sections 10a and 10b includes a supporting frame 12 upon which is fixedly mounted sub-flooring 14 as seen in FIGS. 8 and 9. Floor joists 16 are mounted upon subflooring 14 and main flooring 18 is mounted on the joists 16 and substantially spans each supporting frame section 12 to complete a floor structure.

A side wall 20 rests upon the floor structure at 22 and is secured thereto by hinge means 24, such as a piano type hinge having one plate thereof secured to the inner face of wall 20 and the other plate secured to the floor structure, permitting side wall 20 to pivot from an upstanding or erect position bearing upon the main floor 18 to a substantially horizontal position resting upon and overlying part of the floor. The opposite side wall 26 bears upon a member 30 of the floor structure which projects above the main flooring 18 and has a height preferably slightly higher than the level of the top surface of side wall 20 when collapsed. Hinge means 32 have their plates secured to the inner faces of the member 30 and side wall 26 to permit the pivoting of the side wall 26 from its upstanding or erect position to a substantially horizontal position resting upon and partially overlying the side wall 20 in its horizontal collapsed position.

An end wall 34 is mounted on an end of the floor structure. End wall 34 is of sufficient width to overlap the end edges of side walls 20 and 26 while in an erect position. End wall 34 bears upon a member 36 of the floor structure which projects above the main flooring 18. Hinge means 40 have hinge plates secured to the innerfaces of member 36 and end wall 34 and permit the end wall 34 to pivot inwardly from its upstanding or erect position to a substantially horizontal position overlapping the horizontally positioned walls 20 and 26.

A roof structure 42 of any suitable construction is adapted to span the erected side and end walls and may include a bowed top plate or panel 44 carried by a rigid frame, vertically depending side plates 46 and at least one vertically depending end plate 48. The roof structure preferably has grooves or guides at its bottom fitting on the upper ends of the walls. The side plates 46 and end plate 48 overlap the upper margins of the side and end walls when said walls are in their upstanding positions. A plurality of longitudinally spaced hooks 116, whose function will be later described, are carried by brackets 117 secured to the side plates 46 of each roof structure 42.

In the preferred construction the supporting frame 12a of mobile home section 10a as seen in FIGS. 4, 6, 11 and 17 includes two parallel longitudinally extending metal frame members 50 each preferably of channel cross sectional configuration. The longitudinal members 50 are secured to spaced transverse frame members 52 and 60. Longitudinally projecting sockets 54 at the rear corners of the frame each have a vertical aperture 56 therein for receiving and mounting a stacking post 58. Preferably mounted proximate the forward end of support frame 12a are wheel and axle assemblies 62. Each wheel and axle assembly 62 includes an axle 64 journaling wheels 66. Supporting springs 68, preferably leaf springs, are secured to axle 64 adjacent each wheel 66 and normally have their ends mounted and shackled to longitudinal support members 70 spaced inwardly from frame member 50 and positioned between one end transverse frame member 52 and an adjacent transverse frame member 60 to outline wheel wells. The spaces outlined by the members 70, 52 and 60 provides a well for the storage of wheels 66 in the collapsed disassembled relation of the parts seen in FIG. 17, and the axles 64 and springs 68 may be stored between frame parts 60 as seen in FIG. 17 when disconnected. Support frame 12a may be further braced at its forward end by cross support members 72 extending between members 70.

At the inner end of frame section 12a is a narrow connecting portion 74. This assembly consists of longitudinally projecting members 76, each inwardly spaced from and projecting endwise beyond longitudinal frame members 50 and fixedly mounted at one end to transverse frame member 52. A transverse channel member 78 is secured to and connects the end portions of members 76. Member 78 is preferably of a C-shape in cross section with its open side outermost. Apertures 56 are provided in the outer ends of the members 76 for the purpose of mounting stacking posts 58.

The frame section 12b is similar in construction to frame section 12a, having substantially parallel longitudinal frame members 50 and spaced transverse frame members 60. The spacing between substantially parallel frame members 50 of both frame sections 12a and 12b is the same. A transverse frame member 52 is secured to the outer end of members 50 of frame section 12b. Sockets 54 with stacking post apertures 56 project from the frame section 12b at its opposite sides. The inner end parts of longitudinal frame members 50 of frame section 12b project longitudinally beyond the transverse channel member 60a. Transverse channel member 60a is preferably open at its outer side and is of a height less than the height of channel 78 so as to permit its insertion within the open side of channel member 78 of support frame 12a as shown in FIG. 5. Transverse channel member 60a is so positioned from the adjacent ends of longitudinal members 50 of frame section 12b as to permit the ends of longitudinal frame members 50 of frame sections 12a and 12b to abut as transverse channel member 60a is inserted into transverse channel member 78. Apertures formed in the flanges of channel members 78 and 60a are adapted to register to receive bolts 80 held in place by nuts 82 threaded thereon.

A plate member 84 may be mounted to span the interior open side of each longitudinal member 50 of frame section 12b projecting beyond transverse frame member 60a. Plate 84 serves as a spacer or guide to position the members 76 of the connecting portion 74 of frame section 12a when the frame sections 12a and 12b are assembled and receives securing members (not shown) for connecting members 76 of frame section 12a and members 50 of frame section 12b. Apertures 56 are formed in the inner ends of members 50 of frame section 12b to mount stacking posts 58.

A sealing strip member 86 overlies each joint between the walls of the same mobile home section and between the abutting walls and roofs of sections 10a and 10b and is fixedly secured in operative position by screws 88 (see FIG. 7) so as to provide a structural joint and a weather seal.

A tow bar 90 (see FIG. 4) is carried by and extends longitudinally centrally of the forward or outer end portion of frame section 12b. The tow bar is preferably of tubular construction and may be slidably and non-rotatively disposed within centrally located concentric apertures formed in the support member 52 and adjacent transverse members 60 of frame section 12b. A plate or stop member 94 of a size larger than the apertures in support members 60 and 52 is mounted on the inner end of tow bar 90. During shipment of the trailer, tow bar 90 may be slid longitudinally within the outline of frame section 12b or longitudinally inwardly relative to stake sockets 54. During assembly of the mobile home, tow bar 90 may be pulled out and secured in its operative projecting position shown in dotted lines in FIG. 4. A hitch or coupler 96 is mounted on the outer end of the tow bar 90. The tow bar may be braced by diagonal members 98 to define an A-frame (see FIG. 1).

A typical floor plan of mobile home unit 10 is shown in FIG. 10, being divided in rooms by removable partition panels 100 and doors 102. Appropriate house-hold fixtures and appliances are removably mounted on the floor structure, such as sink 104, lavatory stool 106, lavatory water tank 108 and wash basin 110. These appliances and fixtures are adapted to be arranged in the collapsed unit 112 aas shown in FIGS. 15 and 17. To accomplish this, after the roof structure is removed, the side wall 20 is folded inwardly and caused to lay upon floor structure (see FIG. 13). The height of the side walls 20, 26 is preferably less than the width of the floor structure, thereby permitting the storage of such items as doors 102 and wall partitions 100 upon floor 18 between the member 30 and the top edge of folded side wall 20. Side wall 26 is then folded over upon side wall 20 (see FIG. 14), with other partitions and doors being placed over side wall 20 along the top edge of folded side wall 26. End wall 34 is now folded over and upon side wall 26 (see FIG. 15) with remaining partitions, cabinets, appliances and fixtures being stored in the open spaces in the folded framework.

Over the top of each collapsed unit 112 is mounted the roof structure 42 as shown in FIG. 9 with the depending roof side plates 46 and end plate 48 fitting around the outer edges of the folded walls and the individual components arranged in the collapsed unit as described above. Packing material (not shown) may be placed around component items of the mobile home which are stored within the folded assembly so as to substantially prevent shifting of the component items. A collapsed unit 112 and mounted roof is arranged in inverted position and the spaces between frame members 50, 52, 60 may be filled as shown in FIGS. 16 and 17 with such component items as axle assemblies 62 including attached springs 68, wheels 66, water heaters 105, wash basins 110, lavatory stools 106, water tanks 108, combination kitchen sinks 104 and other hardware appliance items. These items are also preferably packed in packing material. A second collapsed unit 112 preferably including a frame of the same size and configuration as the frame of the first inverted collapsed unit is placed or mounted upon said inverted collapsed unit with the two frames registering (see FIGS. 16 and 19). The height of longitudinal frame members 50 is such that when the support frames are so mounted in register, storage compartments of adequate size to accept the component items, such as wheel and axle assembly 62, stools 106 and other associated hardware of the mobile home, are provided. The roof structures 42 are secured to the paired collapsed units 112 by means of flexible securing members 118, such as ropes or cables, drawn around opposing hooks 116 attached to the respective roof assemblies as shown in FIGS. 2, 18 and 19.

To stack the connected paired collapsed units 112 as shown in FIGS. 2, 18 and 19, a first collapsed unit 112 having its roof structure 42 mounted thereover and lashed to its frame by means of flexible securing members 118 drawn tight around hooks 116 on the roof structure and opposed hooks 119 attached to the sides of longitudinal members 50 of the frame or floor structure is placed in a horizontal position with its frame lowermost. Stacking posts 58 having end portions of reduced cross section are then mounted in each of the apertures 56 of the sockets 54 projecting at the four corners of the frame. A pair of connected collapsed units assembled in inverted relation, as previously described, then is supported upon the stacking posts 58 which extend upwardly from said first single collapsed unit and fit within apertures 56 of the lower most sockets 54 of said pair of connected collapsed units. Four more posts 58 are then mounted in the apertures 56 of the uppermost sockets 54 of the pair of connected collapsed units and upon these posts may be mounted another connected pair of collapsed units, thereby completing the stacked assembly 120a or 120b. It is preferably to include in each stacked assembly 120a and 120b only those folding assemblies 112 which include support frames 12a or 12b of similar configuration in order for the socket apertures 56 of respective support frames to register thereby accommodating the stacking posts 58.

As shown by a comparison of FIGS. 1 and 2, five complete mobile home units 10, each consisting of two sections 10a and 10b may be collapsed and stacked into two assemblies 120a and 120b whose combined volumes are approximately the same as the volume of one assembled or erected mobile home unit 10. While this description pertains to the collapse and stacking of five complete mobile homes and their storage into a volume representing that of a single erected mobile home, the invention is not to be limited by the size and number of homes which can be collapsed and stored in the manner herein disclosed. Depending upon the size, furnishings, and materials of construction, the number of mobile homes that can be stacked in a given space will vary.

In some circumstances it may be advantageous to construct a small mobile home which collapses into a single unit instead of two units as here shown and described, which unit will have four pivotally mounted walls and a separate roof structure.

The stacked assemblies 120a and 120b shown in FIG. 2, upon arrival at their destination are disconnected or separated and each is erected in a manner opposite to the method of collapsing a unit hereinbefore described. The erection and assembly of the mobile home units 10 can be accomplished quickly and easily by persons of ordinary mechanical skill using general purpose tools, and the resultant vehicle is strong and weather tight.

It will be understood that the invention is not to be limited to the details herein given but it may be modified within the scope of the appended claims.

What I claim is:
1. In combination,
two collapsible mobile home units;
each mobile home unit including a floor structure having an open support frame with flooring mounted thereon, side and end walls hinged to said floor structure and bearing upon said structure when in erected positions and overlying said structure when in substantially horizontal collapsed positions, a roof overlying and supported upon said side and end walls and having depending side and end plates mountable over the upper margins of said walls when said walls are in their erected positions and fitting around said walls when said walls are in their collapsed positions;
said units when collapsed being positioned with the undersides of their respective support frames in face engagement; and
releasable means for connecting the roofs of said collapsed engaging units.

2. The combination of claim 1, wherein said mounting means includes hooks affixed to selected depending plates of each roof, and an elongated flexible securing member anchored to adjacent hooks of opposite roofs.

3. The combination of claim 1, and a third collapsed mobile home unit positioned below said collapsed engaging units, the floor structure of each unit including laterally projecting socket members extending beyond the outline of the roof of each collapsed unit, a set of rigid spacing means mounted in and projecting upwardly from the socket members of said third collapsed mobile home unit and seating in the socket members of the lowermost unit of said collapsed engaging units to support said engaging units spaced above said third unit.

4. The combination of claim 3, and a second set of rigid spacing means mounted in and projecting upwardly from the socket members of the uppermost unit of the first named pair of collapsed engaging units, and a second pair of collapsed engaging units having the socket members of the lowermost unit thereof supported and mounted upon said second set of spacing means to support and position said second pair of collapsed engaging units spaced above said first pair of collapsed engaging units.

5. A collapsible mobile home comprising, a floor structure including an open support frame and flooring mounted thereon; side and end walls bearing upon said floor structure, and hinge means connecting each wall to said floor structure; means carried by said floor structure to position the hinging axes of selected walls at different elevations than the elevations of the hinging axes of the other walls to permit said walls to assume substantially horizontal overlapping positions overlying said floor structure; and a roof supported upon said side and end walls, said roof having depending side and end plates mountable upon the upper margins of said walls when said walls are in their erected positions and fitting around said walls when in their collapsed positions; said support frame including substantially parallel longitudinal channel members, transverse channel members spaced along said longitudinal channel members and mounted across the ends thereof, one end transverse channel member set inwardly from the ends of said longitudinal channel members, said end transverse channel member and at least one adjacent transverse channel member having concentric apertures therein positioned substantially midway between longitudinal channel members, an elongated rigid member slidable within said apertures and having one end projecting exteriorly of the frame, a stop member of larger dimension than the apertures mounted upon the inner end of said elongated member, and coupling means for attachment to a towing vehicle mounted to the exterior projecting end of said elongated member, whereby said coupling means may be placed in extended or retracted positions relative to the support frame.

References Cited

FOREIGN PATENTS 1,294,247  4/1962  France.

PHILIP GOODMAN, Primary Examiner

U.S. Cl. X.R.

52—64